Sept. 26, 1967 J. BESSE 3,344,230
RECEIVERS FOR RECEIVING A COLOUR TELEVISION SIGNAL INCLUDING
A FREQUENCY-MODULATED SUBCARRIER
Filed July 12, 1965

INVENTOR.
JEAN BESSE
BY Kurt Kelman
Agent

United States Patent Office 3,344,230

Patented Sept. 26, 1967

3,344,230

RECEIVERS FOR RECEIVING A COLOUR TELEVISION SIGNAL INCLUDING A FREQUENCY-MODULATED SUBCARRIER

Jean Besse, Levallois, France, assignor to CFT-Compagnie Francaise de Television, a corporation of France Filed July 12, 1965, Ser. No. 471,142
Claims priority, application France, July 15, 1964, 981,693
4 Claims. (Cl. 178—5.4)

The present invention relates to improvements in television receivers adapted to co-operate with transmitters of the SECAM (Registered trademark) system, or any other colour television system wherein the composite video signal includes a luminance signal and a subcarrier which has been frequency-modulated by a colour information, and thereafter passed through a filter whose amplitude-frequency characteristic, also called frequency response, in the bandwidth allotted to the subcarrier channel, increases on each side of a predetermined frequency $F_0$.

It is known that the SECAM (Registered trademark) system uses a subcarrier which is alternately frequency-modulated by two colour signals alternating at the line frequency, and which, for protection against noise, is passed, in the transmitter, through a filter, usually referred to as a coding filter, whose amplitude-frequency characteristic increases on each side of the resting frequency of the subcarrier. This measure is combined with a pre-emphasis of the higher frequency components of the colour signals which alternately modulate the subcarrier.

In the receiver suitable measures are taken to ensure the correct restitution of the colour signals transmitted by means of the subcarrier.

It is known practice to eliminate to a large extent from the luminance signal used in receivers the parasitic signal formed by the subcarrier. To this end, a "trap" is used that is, a circuit causing a strong attenuation of the components of the complex video signal located within a "stop band" including the subcarrier frequency.

More particularly, it is an object of this invention to provide an improvement of the trap where a composite video signal of the above type is used.

According to the invention, there is provided a receiver capable of receiving a colour television composite video signal including a luminance signal and a subcarrier which is frequency-modulated by a colour information and is superimposed on said luminance signal in a portion of the bandwidth thereof, said frequency-modulated subcarrier having been, at the transmitting end, before its addition to the luminance signal, passed through a filter, referred to as a coding filter, whose amplitude-frequency characteristic, in the frequency bandwidth of the subcarrier channel, increases on both sides of a predetermined frequency $F_0$, said receiver comprising in the luminance channel a trap whose amplitdue-frequency characteristic shows a relative maximum for frequency $F_0$, and two minima for two frequencies F′ and F″ respectively located on both sides of frequency $F_0$, said trap attentuating each of the two frequencies F′ and F″ relatively to frequency $F_0$ substantially in the same ratio as it was enhanced by the coding filter relatively to frequency $F_0$.

It should be noted that black-and-white receivers adapted to receive the aforesaid composite video signal and to provide a black-and-white picture by means of the luminance signal can also be provided with a trap according to the invention, and that such receivers should be understood to be included in the ambit of the appended claims.

Irrespective of whether colour or black-and-white television receivers are concerned, the above trap may of course by associated with commutating means switching out the trap when a black-and-white composite video signal is being received.

For a better understanding of the invention and to show how the same may be carried into effect, reference will be made to the drawings, accompanying the following description and in which.

Figures 1, 2, 3:
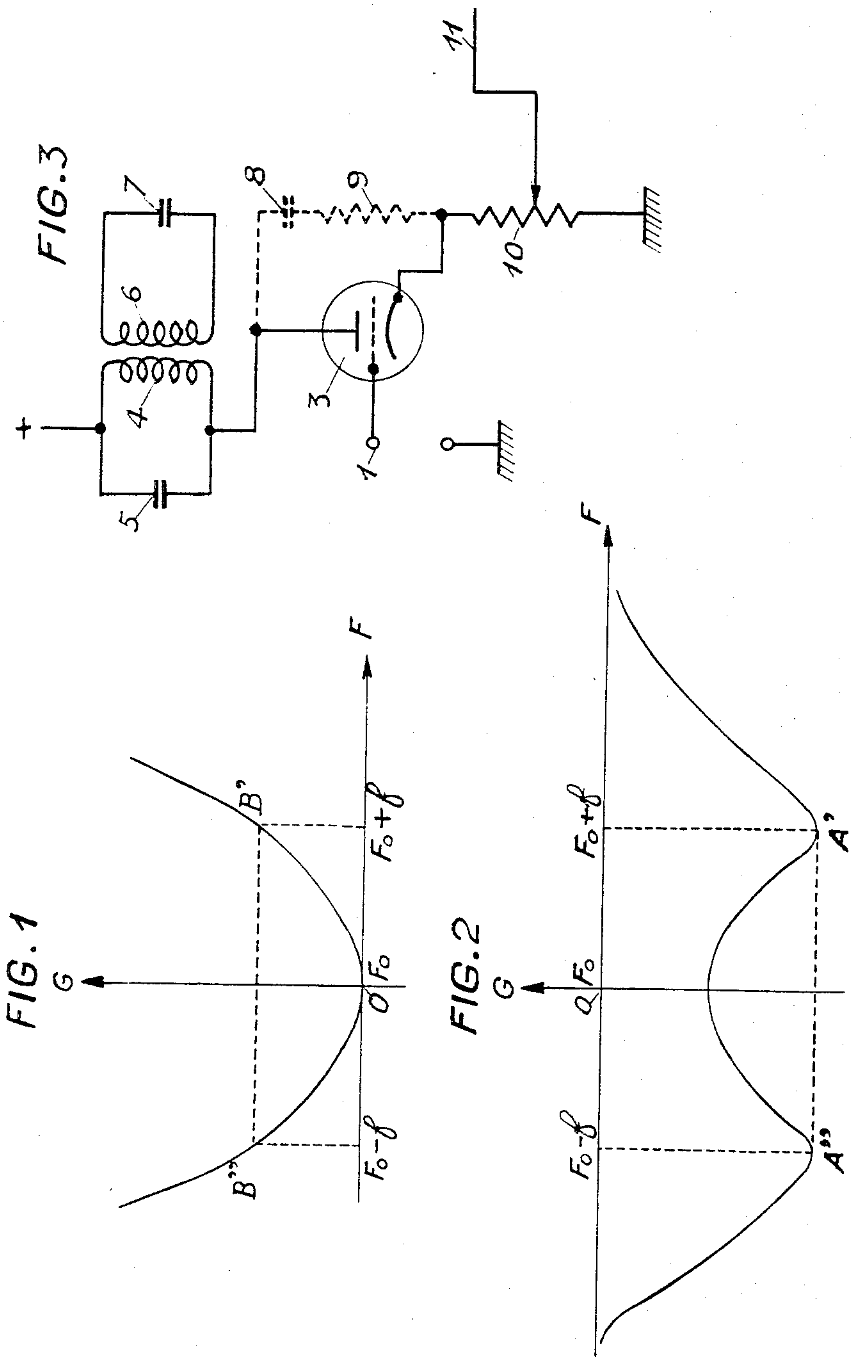
FIG. 1 shows, between the frequencies $F_0-F$ and $F_0+f$, the amplitude vs. frequency curve of a coding filter suitable for the transmission.
FIG. 2 shows the corresponding characteristic of a trap according to the invention.
FIG. 3 shows an embodiment of a trap having the characteristic of FIG. 2.

It should first be noted that in the case under review of a frequency-modulated subcarrier two conflicting conditions must be taken into consideration:

(1) For the trap to be efficient in spite of the frequency modulation, the stop band must be sufficiently wide.

(2) For the trap not affect excessively the luminance signal (since the useful components located in the stop band are also eliminated by the trap) the stop band must be as narrow as possible.

Experience confirmed by theoretical considerations shows that the parasitic signal, which the subcarrier builds up for the luminance signal, is sufficiently eliminated if, at any moment, the frequencies located in the immediate vicinity of the instantaneous subcarrier frequency are strongly attenuated.

From this point of view, the stop band must therefore cover the frequency swing of the subcarrier. However, this is too wide from the viewpoint of the amputation suffered by the luminance signal if the frequency swing is large.

In the particular case of the "SECAM" (Registered trademark) system, with regard to which the invention will be described by way of example and in a non-limitative manner, the video frequency colour signals building up the colour information are passed, before they frequency-modulate the subcarrier, through a pre-emphasis filter enhancing their higher frequency components relatively to their lower frequency components. This measure is known to introduce, in the abrupt transitions, positive or negative peaks which are high but extremely fugitive and which the frequency swing of the subcarrier must permit to transmit, but which may be disregarded in so far as the elimination of the parasitic signal, which the subcarrier is for the luminance signal, is concerned.

Let N′ be the maximum positive value of the input signal of the pre-emphasis filter; when this value N′ appears in the input signal for a sufficiently long duration, there appears at the output, after a transition period, a flat level of value $n'$.

N″ and $n''$ are the values corresponding to N′ and $n'$ for the negative polarity.

Experience shows that, in this case, it is sufficient to consider the instantaneous frequencies of the subcarrier corresponding to the range of signal values between $n''$ and $n'$ at the output of the pre-emphasis filter.

It will now be assumed by way of a non limitative example that $-N''=N'$ and $-n''=n'=n$.

The range of the instantaneous frequencies to be strongly attenuated varies therefore from $F_0-f$ to $F_0+f$, where $F_0$ is the resting frequency of the subcarrier and $F_0-f$ and $F_0+f$ are the instantaneous frequencies associated, respectively, with the values $-n$ and $+n$ of the output signal of the pre-emphasis filter.

The present standard values used in the "SECAM" (Registered trademark) system are $F_0=4.43$ mc./s. and $f=250$ kc./s.

Conventional traps have an amplitude vs. frequency characteristic with a minimum for the frequency $F_0$ and, if it is desired to ensure sufficient attenuation of the extreme frequencies $F_o-f$ and $F_o+f$ of the interval considered, either this minimum will be much lower than necessary for the frequencies near $F_o$, or it is not so low but the frequencies outside the critical interval $F_o-f$ to $F_o+f$ are still strongly attenuated over much too wide frequency intervals. In either case, there follows an undesirable deterioration of the luminance signal.

By means of a more elaborate trap it is possible to approach the "ideal" rectangular curve of a band-stop filter (substantially flat minimum between $F_o-f$ and $F_o+f$).

However, even this trip causes an undesirable deterioration of the luminance signal, since, what is important, is the amplitude of the components of the band between $F_o-F$ and $F_o+f$ at the output of the trap and not the degree of attenuation they have suffered in the trap.

Owing to the coding filter, the maximum amplitudes which these components may present grow on either side of $F_0$ and, if the trap is designed for the maximum attenuation which may be necessary for the components at the limits of this interval, the luminance signal is undesirably affected for the centre frequencies of this interval.

FIG. 1 shows along the abscissae the frequencies F and along the ordinates the relative gains, expressed in decibels relative to the gain for the frequency $F_o$, of the coding filter for the centre part of the frequency swing covering the interval $F_o-f$ to $F_o+f$, as defined above.

The points B′ and B″ are the points of the curve whose abscissae are $F_o+f$ and $F_o-f$.

FIG. 2 shows, with the same co-ordinates as the curve in FIG. 1 but with the origin of the ordinates corresponding to minimum attenuation caused by the trap, the amplitude-frequency curve of a trap used according to the invention. This curve presents two minima in A′ and A″, for frequencies F′ and F″ on either side of the resting frequency $F_0$ and a relative maximum for the frequency $F_o$, the difference between the ordinates of the points of abscissae $F_0$ and F′ (or F″) being the same as on the characteristic of FIG. 1, but with the opposite sign.

Preferably, as shown in the drawing, the two minima occur for the frequencies $F''=F_o-F$ and $F'=F_o+f$. It is also desirable that if the curve of FIG. 2 were translated so that points A′ and A″ would be respectively superimposed on points B′ and B″ of the curve of FIG. 1, the portions of the two curves limited by points A′ and A″ should be symmetrical with respect two A′ A″. This will generally be fulfilled with sufficient approximation if, as indicated, the gap between the respective ordinates of the points A′ and A″ and the ordinate of the point of abscissa $F_0$ in FIG. 2 is equal to and has the sign contrary to that of the gap between the respective ordinates of the points B′ and B″ and the ordinate O of the point whose abscissa is $F_0$ of the curve in FIG. 1.

With the coding filter presently used at the transmission in the "SECAM" (Registered trademark) system this gap is 6 db.

On the other hand, it has been found that an attenuation of —12 db by the trap is necessary for the frequencies in the vicinity of $F_o+f$ and $F_o-f$.

It appears immediately that whilst the conventional traps gave for the components near $F_0$ an attenuation higher than —12 db, the attenuation of the frequency $F_0$ is reduced to —6 db with the trap according to the invention.

Experience confirms that, for equivalent results as concerns the elimination of the visual disturbance caused by the presence of the subcarrier in the luminance signal, a trap having a characteristic of this type impairs much less the quality of the latter.

It should be noted that the "SECAM" (Registered trademark) subcarrier can, in addition to the above mentioned filtering, undergo an auxiliary amplitude modulation, for example (as a measure of protection against cross-talk from the luminance signal) as a function of the signal built up by the components of the luminance signal lying in the subcarrier channel. Experience shows that an amplitude-modulation of this type does not eliminate the advantages of the trap used according to the invention.

FIG. 3 shows an embodiment of the trap according to the invention.

A triode 3 is mounted in a cathode-follower circuit with its input 1 on the grid and its output coupled to the cathode.

The cathode resistance 10 is, in this embodiment and for reasons explained later, a potentiometer resistor with the amplifier output connected to the slider 11, but could naturally also be a simple resistor.

The peculiarity of the cathode-follower consists in the anode load. The latter comprises a primary parallel resonant circuit tuned to the frequency $F_o$, inserted between the high voltage and the anode, and comprising a capacitor 5 and an inductance coil 4, the latter being coupled to an inductance coil 6 of a damped secondary resonant circuit, also tuned to the frequency $F_o$ and comprising, in addition to the inductance coil 6, a capacitor 7. If necessary, i.e., if the natural damping of the circuit 6–7 is insufficient, the same may comprise a resistor in series with the elements 6 and 7.

The inductances 4 and 6 are preferably formed by the two windings of a transformer.

The primary circuit 4–5, loaded by the secondary circuit 6–7 forms, for the output signal taken from the slider 11 (or from the cathode where the resistor 10 is a simple resistor) a trap which attenuates the frequencies in the vicinity of $F_o$ and which may be adjusted so that one obtains an attenuation curve of the type shown in FIG. 2. In fact, by a loose coupling between the windings 4 and 6, the impedance of the circuit 4–5 loaded by the circuit 6–7 presents a maximum for $F_o$; starting from a certain degree of coupling this maximum divides itself into two maxima located on either side of $F_o$ and separated by a relative minimum for $F_o$, the frequency interval between these two maxima growing with the degree of coupling.

It is thus possible to regulate the coupling so as to obtain the two impedance maxima near $F_o-f$ and $F_o+f$, and the other constants of the circuit so as to obtain the desired values for the minima and for the relative maximum of the curve of FIG. 2.

More precisely, the depth of the two minima is regulated relative to the level of the relative maximum through adjusting the damping (the higher the damping, the flatter is the curve). The ratio $L/C$ of the anode circuit determines the attenuation for the frequency $F_o$, which attenuation grows with $L/C$.

By way of example, there is obtained with regard to the least attenuated portion of the output signal, an attenuation of 12 db for $F_o+f$ and $F_o-f$ ($F_o$=4.43 mc./s., $f$=250 kc./s.) and an attenuation of 6 db for $F_o$, with the following numerical values for the circuit elements: Tube: one of the triodes included in the double tube ECC 82:

| | | |
|---|---|---|
| Resistance 10 | ohms | 500 |
| Capacitor 5 | pF | 33 |
| Capacitor 7 | pF | 47 |

The efficiency of the trap may be improved, while avoiding an excessive value of $L/C$, by connecting the anode of the tube 3 to the cathode through a capacitor 8 and a resistor 9, connected in series, as shown in the drawing.

With the above numerical values, the capacitor 8 may have 20 pF and the resistor 9, 15,000 ohms.

The trap described hereinbefore is of special interest where the receiver comprises a cathode follower stage for manual control, by means of a potentiometer, of the gain of the luminance channel.

The potentiometer control should be accessible for the user, and for this reason, the potentiometer is generally located remotely from the other circuits, and, to enable the signal to be applied to the potentiometer without the parasitic capacitance of the conductors reducing the pass-band, it is necessary to have a low source impedance, which results in the use of a cathode-follower for feeding the potentiometer. It is advantageous to combine the trap with the gain control; for this reason in FIG. 3 the cathode resistance 10 is the resistance of the gain control potentiometer.

It must be understood that the invention is not limited to the embodiment shown hereinbefore.

It is applicable especially to any frequency modulated subcarrier, which at the transmitter end has been filtered by means of a coding filter, with or without pre-emphasis of the modulating signal, the latter being taken into consideration only for the selection of the location of the minima of the trap curve, whilst the limits indicated hereinbefore are not imperative but correspond to a preferred embodiment.

What is claimed, is:

1. A receiver capable of receiving a colour television composite video signal including a luminance signal and a subcarrier which is frequency-modulated by a colour information and is superimposed on said luminance signal in a portion of the bandwidth thereof, said frequency-modulated subcarrier having been, at the transmitting end, before its addition to the luminance signal, passed through a filter, referred to as a coding filter, whose amplitude-frequency characteristic, in the frequency bandwidth of the subcarrier channel, increases on both sides of a predetermined frequency $F_o$; said receiver comprising a luminance channel comprising a trap whose amplitude-frequency characteristic shows a relative maximum for frequency $F_o$, and two minima for two frequencies $F'$ and $F''$ respectively located on both sides of frequency $F_o$; said trap attenuating each of the two frequencies $F'$ and $F''$ relatively to frequency $F_o$ substantially in the same ratio as it was enhanced by said coding filter relatively to frequency $F_o$.

2. A receiver capable of receiving a colour television composite video signal including a luminance signal and a subcarrier which is frequency-modulated by a colour information and is superimposed on said luminance signal in a portion of the bandwidth thereof, said colour information having been, previously to its modulating the subcarrier, passed through a pre-emphasis filter, said frequency-modulated subcarrier having been, at the transmitting end, before its addition to the luminance signal, passed through a filter, referred to as a coding filter, whose amplitude-frequency characteristic, in the frequency bandwidth of the subcarrier channel, increases on both sides of a predetermined frequency $F_o$, whereby $F'$ and $F''$ are the two instantaneous frequencies respectively lying on either side of frequency $F_o$, corresponding to the transmission of the maximum positive and negative levels which may appear in a stable manner at the output of said pre-emphasis filter; said receiver comprising a luminance channel comprising a trap whose amplitude-frequency characteristic shows a relative maximum for frequency $F_o$, and two minima for two frequencies $F'$ and $F''$ respectively located on both sides of frequency $F_o$; said trap attenuating each of the two frequencies $F'$ and $F''$ relatively to frequency $F_o$ substantially in the same ratio as it was enhanced by the coding filter relatively to frequency $F_o$.

3. A receiver capable of receiving a colour television composite video signal including a luminance signal and a subcarrier which is frequency-modulated by a colour information and is superimposed on said luminance signal in a portion of the bandwidth thereof, said frequency-modulated subcarrier having been, at the transmitting end, before its addition to the luminance signal, passed through a filter, referred to as a coding filter, whose amplitude-frequency characteristic, in the frequency bandwidth of the subcarrier channel, increases on both sides of a predetermined frequency $F_o$; said receiver comprising a luminance channel comprising a trap whose amplitude-frequency characteristic shows a relative maximum for frequency $F_o$, and two minima for two frequencies $F'$ and $F''$ respectively located on both sides of frequency $F_o$; said trap attenuating each of the two frequencies $F'$ and $F''$ relatively to frequency $F_o$ substantially in the same ratio as it was enhanced by the coding filter relatively to frequency $F_o$; said trap being built up by a circuit including a variable impedance comprising a parallel resonant circuit tuned to frequency $F_o$, and inductively coupled to a damped parallel resonant circuit tuned to said frequency $F_o$.

4. A receiver capable of receiving a colour television composite video signal including a luminance signal and a subcarrier which is frequency-modulated by a colour information and is superimposed on said luminance signal in a portion of the bandwidth thereof, said frequency-modulated subcarrier having been, at the transmitting end, before its addition to the luminance signal, passed through a filter, referred to as a coding filter, whose amplitude-frequency characteristic, in the frequency bandwidth of the subcarrier channel, increases on both sides of a predetermined frequency $F_o$; said receiver comprising a luminance channel comprising a trap whose amplitude-frequency characteristic shows a relative maximum for frequency $F_o$, and two minima for two frequencies $F'$ and $F''$ respectively located on both sides of frequency $F_o$; said trap attenuating each of the two frequencies $F'$ and $F''$ relatively to frequency $F_o$ substantially in the same ratio as it was enhanced by the coding filter relatively to frequency $F_o$; said trap being built up by a cathode follower stage having an anode load and a cathode resistence; said anode load being a variable impedance comprising a parallel resonant circuit tuned to frequency $F_o$, and inductively coupled to a damped parallel resonant circuit tuned to said frequency $F_o$; and said cathode resistance being a potentiometer resistor allowing the adjustment of the gain of said luminance channel.

References Cited

UNITED STATES PATENTS

| | | | |
|---|---|---|---|
| 2,986,597 | 5/1961 | Teer | 178—6 |
| 3,069,679 | 12/1962 | Sweeney et al. | 343—200 |
| 3,303,274 | 2/1967 | De France | 178—5.4 |

JOHN W. CALDWELL, *Acting Primary Examiner.*

J. A. O'BRIEN, *Assistant Examiner.*